US011451432B2

(12) United States Patent
Yerramalli et al.

(10) Patent No.: US 11,451,432 B2
(45) Date of Patent: Sep. 20, 2022

(54) TIMER CONFIGURATION FOR NEW RADIO-UNLICENSED AND NEW RADIO-SHARED SPECTRUM

(71) Applicant: QUALCOMM Incorporated, San Diego, CA (US)

(72) Inventors: Srinivas Yerramalli, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 16/751,869

(22) Filed: Jan. 24, 2020

(65) Prior Publication Data

US 2021/0234751 A1  Jul. 29, 2021

Related U.S. Application Data

(60) Provisional application No. 62/797,677, filed on Jan. 28, 2019.

(51) Int. Cl.
*H04L 41/0659* (2022.01)
*H04L 69/28* (2022.01)
*H04W 16/14* (2009.01)
*H04W 72/04* (2009.01)
*H04W 74/08* (2009.01)
*H04W 76/19* (2018.01)

(52) U.S. Cl.
CPC .......... *H04L 41/0659* (2013.01); *H04L 69/28* (2013.01); *H04W 16/14* (2013.01); *H04W 72/0446* (2013.01); *H04W 74/0833* (2013.01); *H04W 76/19* (2018.02)

(58) Field of Classification Search
CPC . H04W 16/14; H04W 74/0825; H04W 76/19; H04W 36/08
See application file for complete search history.

(56) References Cited

U.S. PATENT DOCUMENTS

| | | | |
|---|---|---|---|
| 2004/0221080 A1* | 11/2004 | Connor | H04L 47/22 710/260 |
| 2015/0049712 A1 | 2/2015 | Chen et al. | |
| 2019/0182889 A1* | 6/2019 | Fujishiro | H04W 76/30 |

(Continued)

FOREIGN PATENT DOCUMENTS

EP        3402290 A1    11/2018

OTHER PUBLICATIONS

International Search Report and Written Opinion—PCT/US2020/015245—ISA/EPO—dated Apr. 20, 2020.

*Primary Examiner* — Raj Jain
(74) *Attorney, Agent, or Firm* — Liem T. Do

(57) ABSTRACT

Timer configurations for new radio (NR) unlicensed (NR-U) and NR shared spectrum (NR-SS) operations are disclosed. In NR-U and NR-SS operations, certain event timers may be interrupted by a user equipment (UE) when it detects that its serving base station has failed a listen before talk (LBT) procedure, thereby losing access to the shared communication spectrum. When the UE detects a subsequent successful LBT, it resumes the progression of the event timer. In NR-SS operations, the UE may also interrupt the applicable timers either in all slots dedicated to another operator or in all slots in which the serving base station does not have transmission access.

24 Claims, 9 Drawing Sheets

(56) References Cited

U.S. PATENT DOCUMENTS

| | | | |
|---|---|---|---|
| 2020/0077319 A1* | 3/2020 | Lun | H04W 36/36 |
| 2020/0154480 A1* | 5/2020 | Jose | H04W 76/19 |
| 2021/0282187 A1* | 9/2021 | Agiwal | H04W 74/008 |

* cited by examiner

TIMER CONFIGURATION FOR NEW RADIO-UNLICENSED AND NEW RADIO-SHARED SPECTRUM

CROSS-REFERENCE TO RELATED APPLICATIONS

This application claims the benefit of U.S. Provisional Patent Application No. 62/797,677, entitled, "TIMER CONFIGURATION FOR NR-U AND NR-SS," filed on Jan. 28, 2019, which is expressly incorporated by reference herein in its entirety.

BACKGROUND

Field

Aspects of the present disclosure relate generally to wireless communication systems, and more particularly, to timer configuration for new radio (NR) unlicensed (NR-U) and NR shared spectrum (NR-SS) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes initiating, by a user equipment (UE), an event timer in response to performance by the UE of an event, a response to which is associated with the event timer, wherein the event timer is identified within one or more event timers subject to an interruption operation, detecting, by the UE, a failed listen before talk (LBT) procedure of a serving base station, suspending, by the UE, a progression of the event timer in response to the failed LBT procedure, monitoring, by the UE, for a result of a subsequent LBT procedure of the serving base station, and resuming, by the UE, the progression of the event timer in response to detection of the result as a successful LBT procedure.

In an additional aspect of the disclosure, an apparatus configured for wireless communications includes means for initiating, by a UE, an event timer in response to performance by the UE of an event, a response to which is associated with the event timer, wherein the event timer is identified within one or more event timers subject to an interruption operation, means for detecting, by the UE, a failed LBT procedure of a serving base station, means for suspending, by the UE, a progression of the event timer in response to the failed LBT procedure, means for monitoring, by the UE, for a result of a subsequent LBT procedure of the serving base station, and means for resuming, by the UE, the progression of the event timer in response to detection of the result as a successful LBT procedure.

In an additional aspect of the disclosure, a non-transitory computer-readable medium having program code recorded thereon. The program code further includes code to initiate, by a UE, an event timer in response to performance by the UE of an event, a response to which is associated with the event timer, wherein the event timer is identified within one or more event timers subject to an interruption operation, code to detect, by the UE, a failed LBT procedure of a serving base station, code to suspend, by the UE, a progression of the event timer in response to the failed LBT procedure, code to monitor, by the UE, for a result of a subsequent LBT procedure of the serving base station, and code to resume, by the UE, the progression of the event timer in response to detection of the result as a successful LBT procedure.

In an additional aspect of the disclosure, an apparatus configured for wireless communication is disclosed. The apparatus includes at least one processor, and a memory coupled to the processor. The processor is configured to initiate, by a UE, an event timer in response to performance by the UE of an event, a response to which is associated with the event timer, wherein the event timer is identified within one or more event timers subject to an interruption operation, to detect, by the UE, a failed LBT procedure of a serving base station, to suspend, by the UE, a progression of the event timer in response to the failed LBT procedure, to monitor, by the UE, for a result of a subsequent LBT procedure of the serving base station, and to resume, by the UE, the progression of the event timer in response to detection of the result as a successful LBT procedure.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
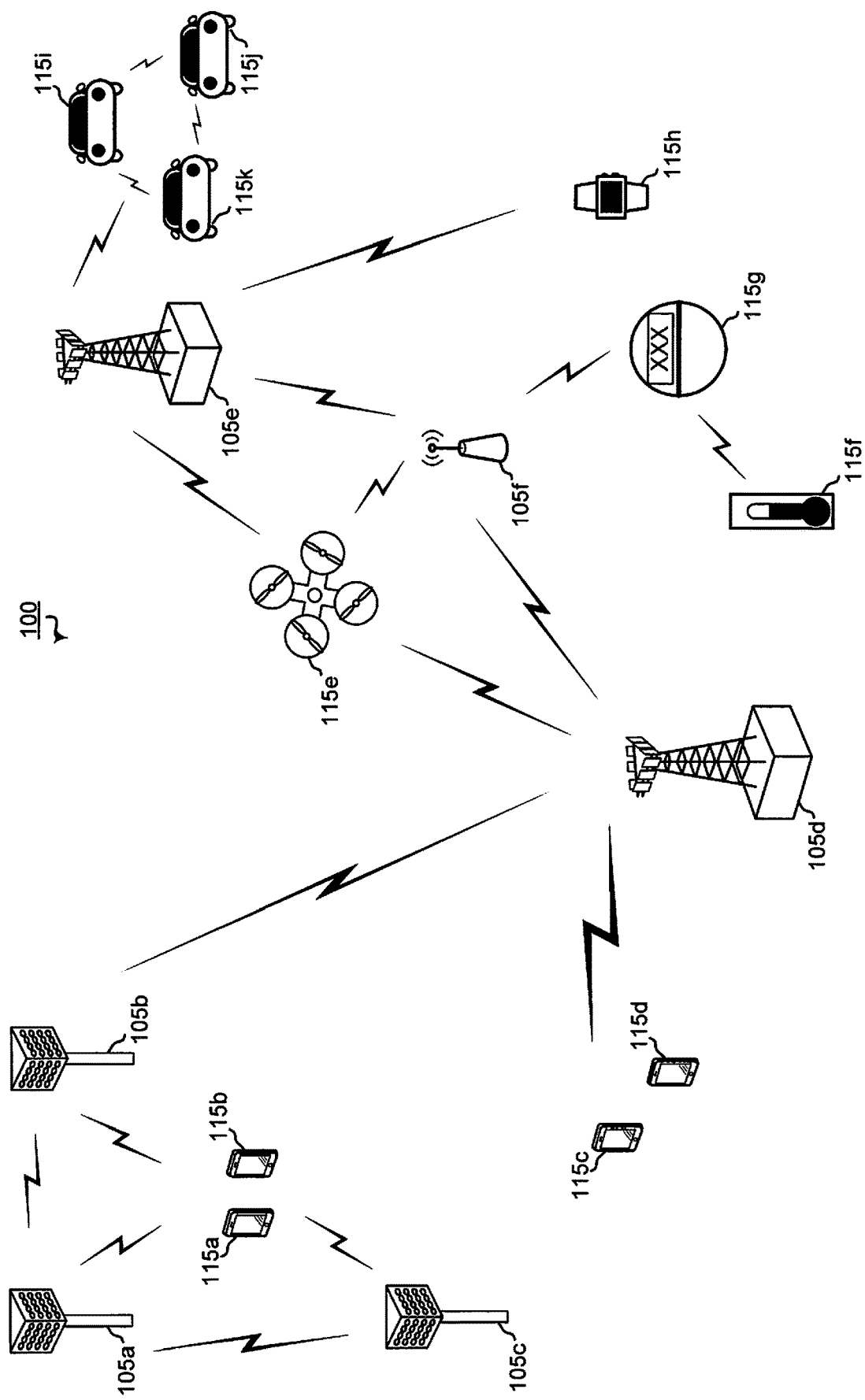
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
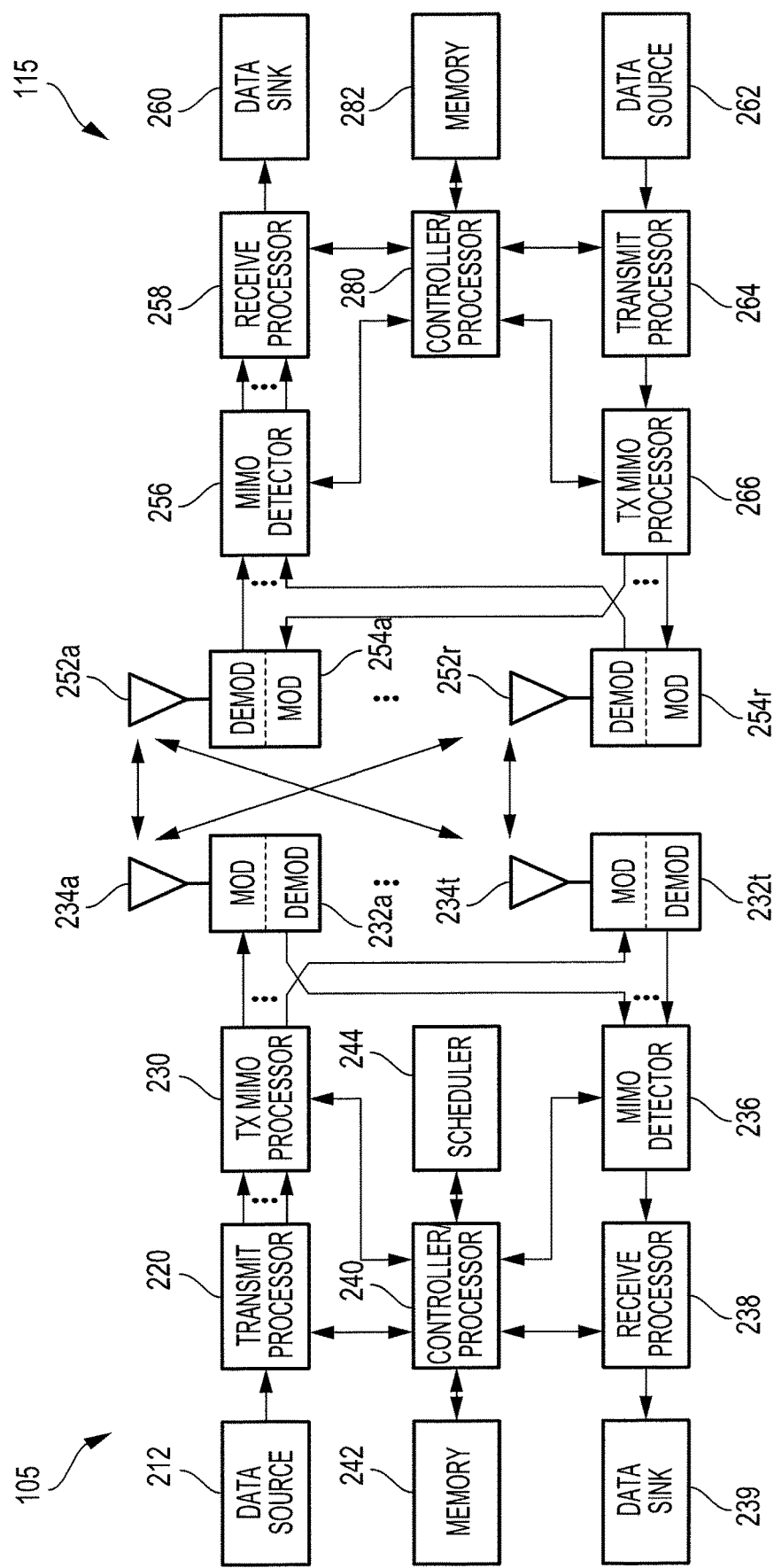
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODS) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 5, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
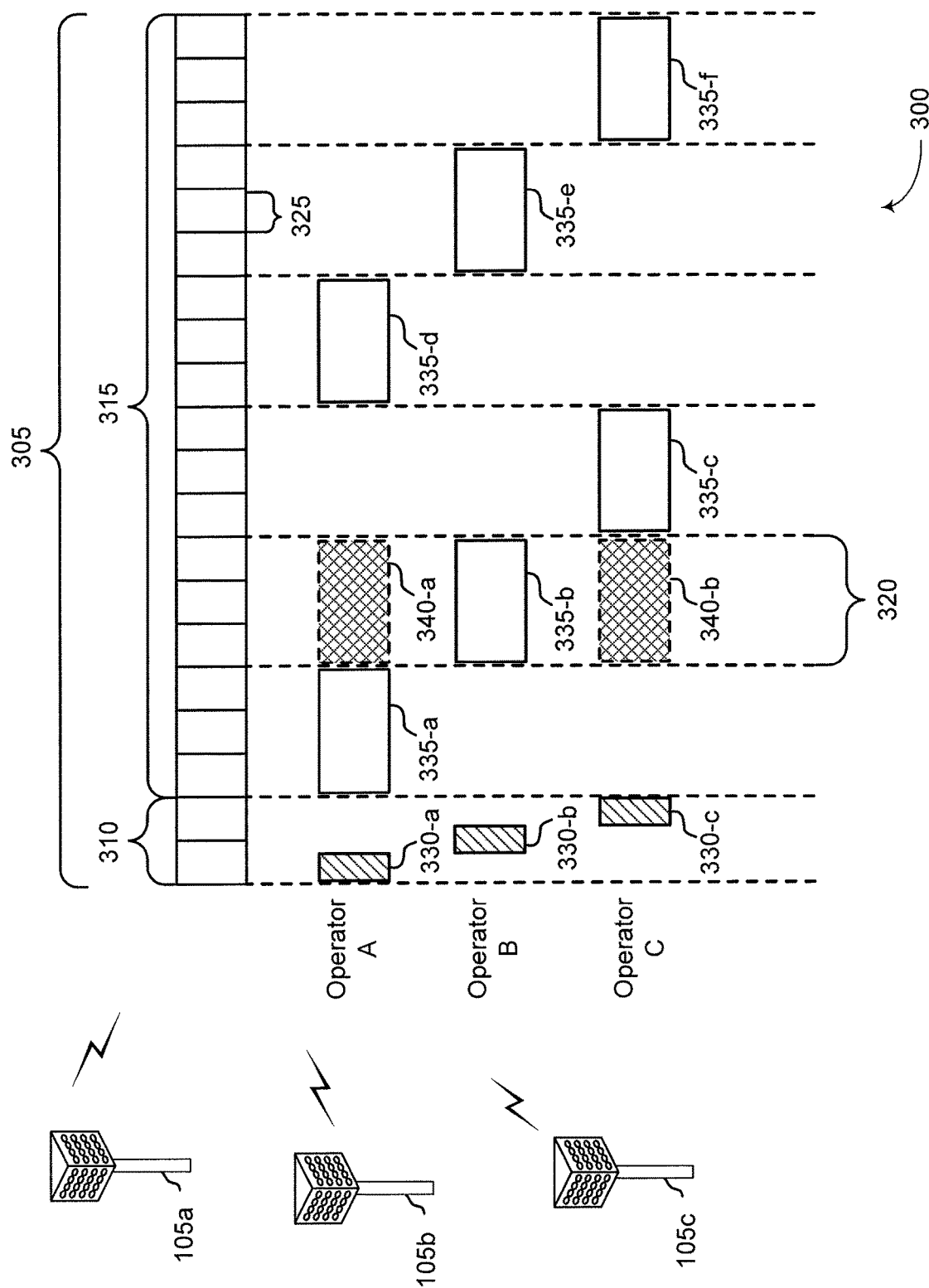
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In NR-U networks, there may be an uncertainty of transmission due to the possibility of LBT failure. Within the various wireless networks and radio access technologies, including NR and NR-U networks, many timers exist for various events which may be fixed values or configured parameters. Historically, fixed or configured timers were inconsequential for non-contention based, non-shared spectrum radio access technologies. However, because of the uncertainties of transmission within contention-based or shared spectrum technologies, existing timers may expire before a subject node successfully wins or secures access to the shared communication channel. A solution that has been commonly suggested to account for such LBT uncertainties has been to increase the timer values for each window when operating in contention-based, unlicensed spectrum. However, while systematically increasing the timer value may result in a measurable increase in successful transmissions, it would also result in increased transmission inefficiencies.

Various aspects of the present disclosure are directed to enhancements related to timer configurations in contention-based, shared NR networks, such as NR-U and NR shared spectrum (NR-SS) operations. There may be a scope of optimization when using frame based equipment (FBE) mode where channel access is performed at the start of transmissions in general. FBE mode is expected to be deployed in scenarios with minimal WiFi interference. FBE mode is also expected to be deployed in NR-SS operations where the medium is shared deterministically and opportunistically between multiple operators. The same concepts can be applied to load based equipment (LBE) mode as well, if the UE is aware of the transmission opportunity (TxOP) structure (e.g., Start location, downlink transmission duration, downlink occasions where multiple switch points as allowed, end location, etc.).

Figure 4:
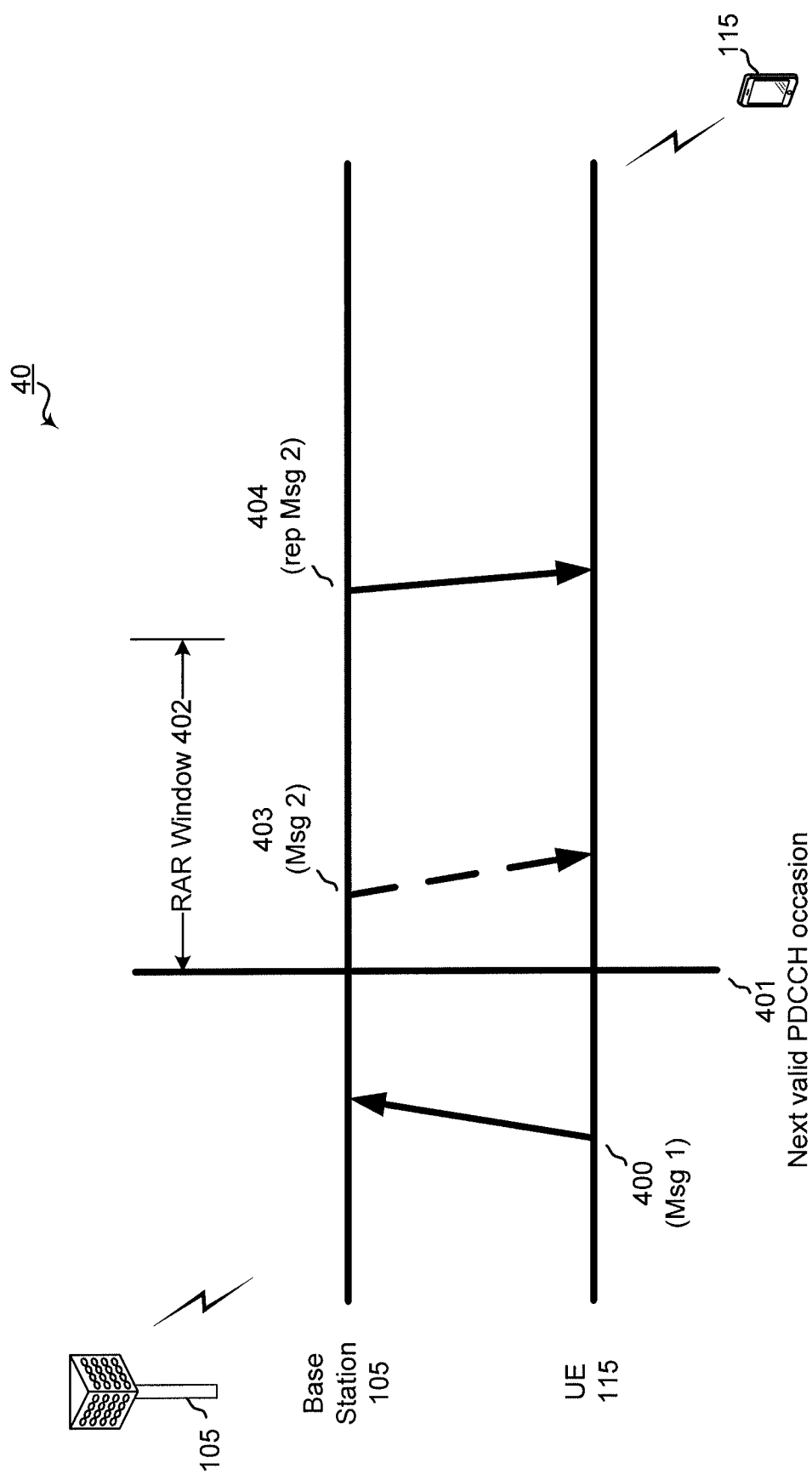
FIG. 4 is a block diagram illustrating an shared communication spectrum network.

FIG. 4 is a block diagram illustrating an shared communication spectrum network 40. Shared communication spectrum network 40 may comprise NR-U network or NR-SS network operations. According to the illustrated example, UE 115 desires to perform random access for beam failure recovery or contention-based random access. At 400, UE 115 transmits Msg 1 to initiate random access. At the next valid downlink occasion, PDCCH 401, UE 115 initiates an event timer that defines random access response (RAR) window 402, within which UE 115 expects to receive or detect the PDCCH transmission. For Contention Free Random Access (CFRA) for beam failure recovery, the timer defining the RAR window 402, configured via radio resource control (RRC) signaling, may be initiated at the first valid PDCCH occasion from the end of the random access preamble transmission (Msg 1). Alternatively, for Contention Based Random Access (CBRA), the timer defining the RAR window 402, also configured vial RRC signaling, may also be initiated at the first valid PDCCH occasion from the end of the random-access preamble transmission (Msg 1). UE 115 monitors the PDCCH occasion, using a random access radio network temporary identifier (RA-RNTI) during the progression of the timer defining the RAR window 402.

During RAR window 402, at 403, base station 105 may intend to transmit Msg 2. However, as a contention-based, shared communication spectrum operation, prior to transmitting Msg 2, base station 105 first conducts an LBT procedure of the shared channel. If, as illustrated in FIG. 4, the LBT procedure conducted by base station 105 fails, no transmission by base station 105 would occur at 403. The next repeat opportunity where base station 105 would transmit Msg 2 lies at 404 beyond the expiration the timer defining RAR window 402. As the timer defining RAR window 402 expires, UE 115 would declare a RACH failure and attempt to re-initiate the RACH procedure with a Msg 1. Various aspects of the present disclosure are directed to an interruption operation in which relevant event timers may be suspended during periods where a serving base station fails LBT access to the shared communication channel.

Figure 5:
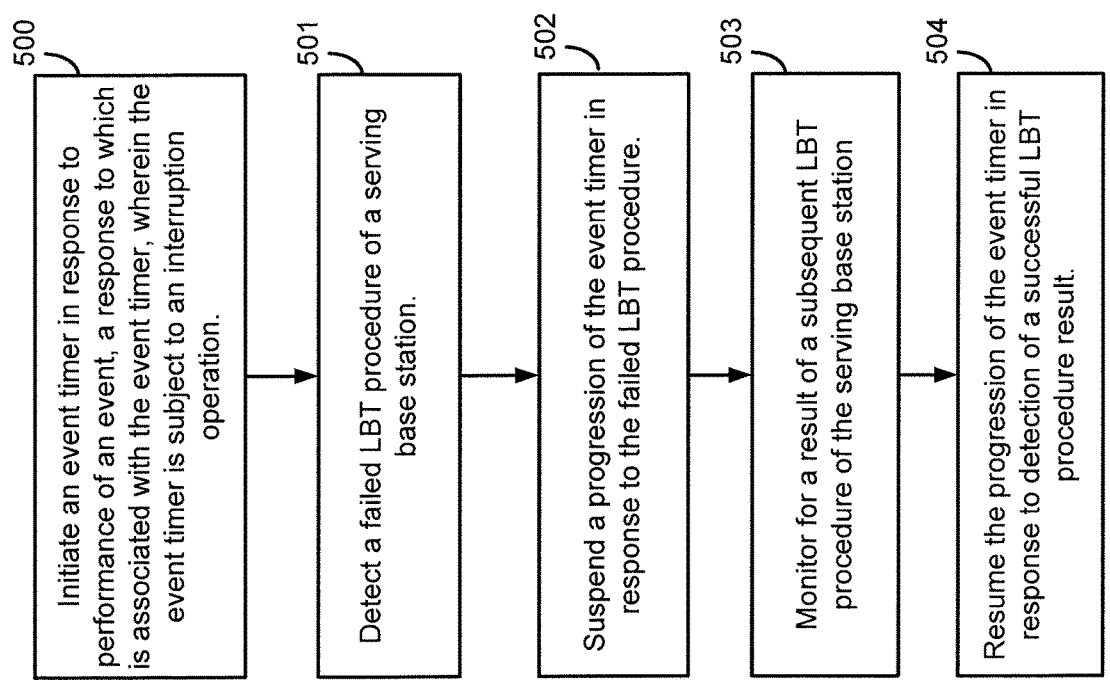
FIG. 5 is a block diagram illustrating example blocks executed to implement one aspect of the present disclosure.
Figure 9:
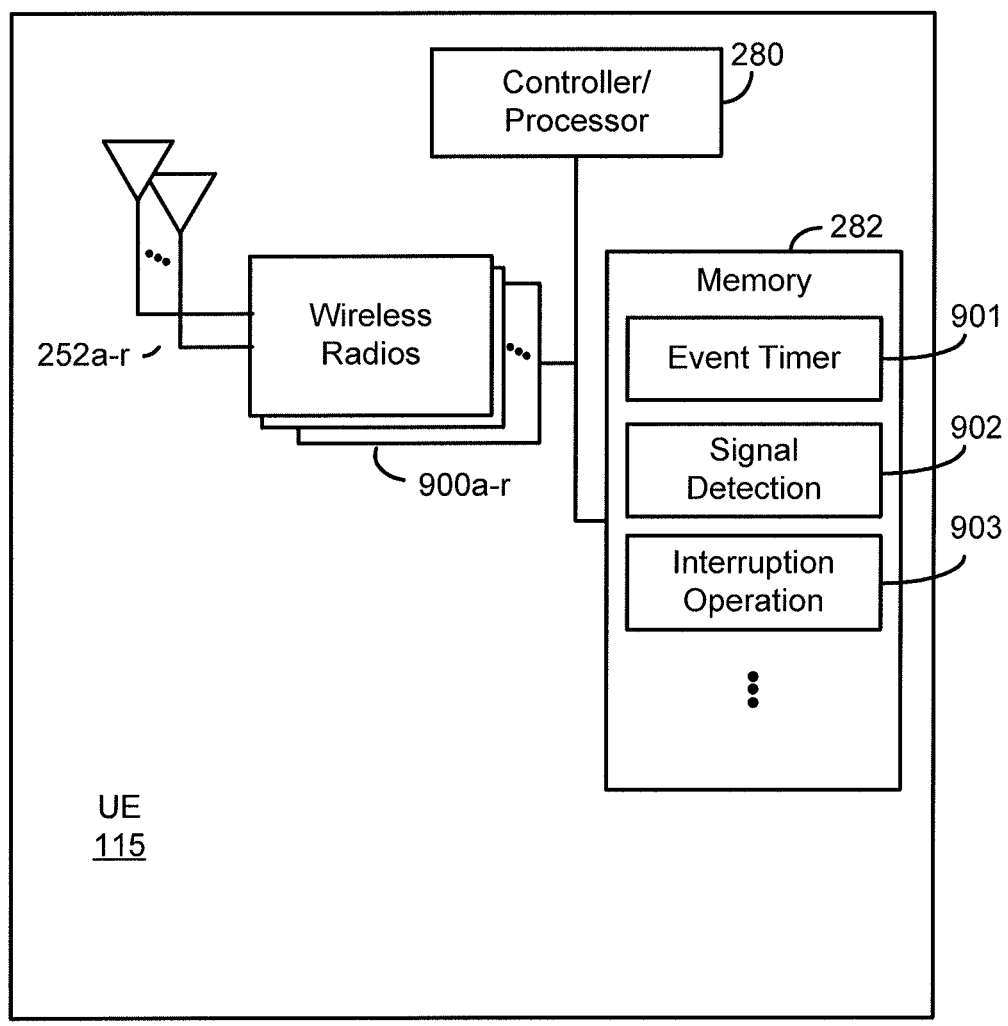
FIG. 9 is a block diagram illustrating an example UE configured according to aspects of the present disclosure.

FIG. 5 is a block diagram illustrating example blocks executed to implement one aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900a-r and antennas 252a-r. Wireless radios 900a-r includes various components and hardware, as illustrated in FIG. 2 for UE 115, including modulator/demodulators 254a-r, MIMO detector 256, receive processor 258, transmit processor 264, and TX MIMO processor 266.

At block 500, a UE initiates an event timer in response to performance by the UE of an event, a response to which is associated with the event timer, wherein the event timer is identified within one or more event timers subject to an interruption operation. A UE, such as UE 115, performs various functions sending request signals, sending and receiving control and data signals, and the like. These events may have a timer associated with an expected response, an event timer. As referenced above, Msg 1 of a RACH procedure includes an event timer that keeps track of a block of time within which UE 115 may expect to detect or receive Msg 2 from the base station. Similarly, after transmitting data, UE 115 may expect to receive an acknowledgement signal within some defined set of slots, subframes, and the like. In response to the even, UE 115, under control of controller/timer 280, executes the appropriate timer, stored in memory 282, at event timer 802. Upon execution of the event timer the predefined period of time associated with that event timer begins to progress or count.

At block 501, the UE detects a failed LBT procedure of a serving base station. As UE 115 receives signals via antennas 252a-r, which are demodulated within wireless radios 800a-r, various detection algorithms may be used to determine what signals have been received. Under control of controller/processor 280, UE 115 executes signal detection logic 803, in memory 282. The execution environment of signal detection logic 803 allows UE 115 to determine whether certain signals are received or not. For example, according to the example aspect, when UE 115 fails to detect signals that are indicative of the serving base station successfully completing an LBT procedure, UE 115 determines that base station 105 has, in fact, failed the LBT procedure.

At block 502, the UE suspends a progression of the event timer in response to the failed LBT procedure. For compatible UEs, such as UE 115, timer suspension capability according to the various aspects of the present disclosure derive from execution, under control of controller/processor 280, of interruption operation 804, in memory 282. The execution environment of interruption operation 804 provide UE 115 with the functionality to determine which event timers may be subject to interruption and, when UE 115 detects that the serving base station has failed the LBT procedure, UE 115, within the execution environment of interruption operation 804, suspends the progression of the event timer currently counting down for response to the event.

At block 503, the UE monitors for a result of a subsequent LBT procedure of the serving base station. With the progression of the event timer suspended within the execution environment of interruption operation 804, UE 115 continues to monitor for signals from the serving base station that would indicate that the serving base station has successfully completed a subsequent LBT procedure. Such determination may be made within the execution environment of signal detection logic 803, which, as noted above, is used to analyze received signals via antennas 252*a-r* and wireless radios 800*a-r*.

At block 504, the UE resumes the progression of the event timer in response to detection of the result as a successful LBT procedure. Within the execution environments of signal detection logic 803 and interruption operation 804, when UE 115 determines that the serving base station has regained access to the shared communication spectrum by successfully conducting an LBT procedure, UE 115 resumes the progression of the suspended event timer.

Figure 6:
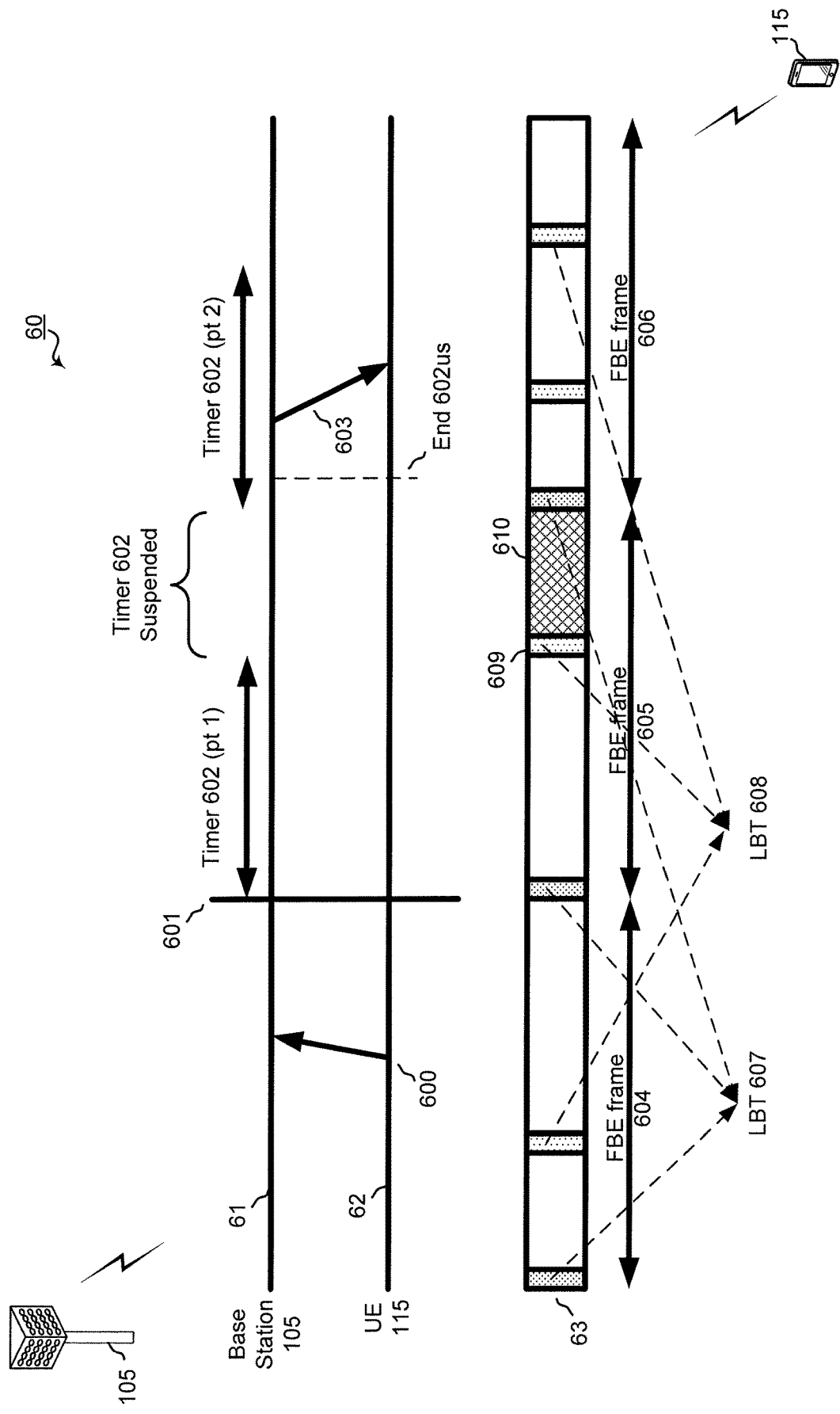
FIG. 6 is a block diagram illustrating a contention-based, shared communication spectrum network having a base station and UE configured according to one aspect of the present disclosure.

FIG. 6 is a block diagram illustrating a contention-based, shared communication spectrum network 60 having base station 105 and UE 115 configured according to one aspect of the present disclosure. As described with respect to the aspect illustrated in FIG. 5, the various aspects of the present disclosure may be applicable in frame-based equipment (FBE) operations and load-based equipment (LBE) operations. The example aspect illustrated in FIG. 6 provides wireless communications via FBE operations. Timelines 61 and 62 of base station 105 and UE 115, respectively, are visualized over frame-based communication stream 63. The illustrated portion of frame-based communication stream 63 includes FBE frames 604-606 through which base station 105 and UE 115 may communicate over the shared communication spectrum of contention-based, shared communication spectrum network 60.

At 600, UE 115 initiates an event. The event may be a particular signal (e.g., Msg 1 of RACH, Msg 3 of a contention-based RACH, etc). The initiation of the event at 600 triggers an event timer 602 to begin at the next event response opportunity 601. For example, if the event triggered at 600 were a Msg 1 of RACH, 601 may be beginning of the next frame, FBE frame 605, where base station 105 may be able to transmit the responding Msg 2. In order to enable transmissions from base station 105, base station 105 performs LBT procedures on the shared communication spectrum. As illustrated, base station 105 performs two types of LBT procedures. A beginning of frame LBT procedure 607 and an intra-frame LBT procedure 608. As indicated, beginning of frame LBT procedures 607 occur at the beginning of each of FBE frames 604-606, while intra-frame LBT procedures 608 occur within the boundaries of FBE frames 604-606.

Base station 105 enables its transmissions by detecting success of each LBT procedure (beginning or frame LBT procedures 607 and intra-frame LBT procedures 608). At 609, base station 105 detects failure of intra-frame LBT procedure 608. Accordingly, base station 105 may not transmit on shared communication spectrum for remaining portion 610 of FBE frame 605. According to the illustrated aspect, upon detecting base station 105's LBT failure at 609, UE 115 suspends progression of event timer 602. UEs, such as UE 115, actively monitor the shared communication spectrum for transmissions from base station 105 to enable or disable suspension of event timer 602. Thus, the progression of event timer 602 can be gated by the LBT outcome at base station 105 through associated signaling detection at UE 115 (e.g., detection of common PDCCH, CSI-RS, etc.).

At the beginning of the next frame, FBE frame 606, base station 105 detects a successful beginning of frame LBT procedure 607. UE 115 detects the resumed signaling from base station 105 and, in response to the detected successful LBT, resumes the progression of event timer 602. Base station 105 transmits the responding signaling 603 after re-capturing the shared communication spectrum in FBE frame 606. UE 115 may then receive responding signaling 603 within the progression of event timer 602. Without the suspension of event timer 602 according to the various aspects of the present disclosure, event timer 602 would have ended at End 602-*us*. In such an unsuspended functionality, UE 115 may have initiated a failure mechanism after not having received responding signaling 603 within the progression of event timer 602. Provision of the timer suspension functionality to UE 115 according to the various aspects of the present disclosure may result in maintaining shorter timers, without the need to increase such timer length uniformly simply because of operations within an unlicensed, shared communication spectrum. The event timers, such as event timer 602, function according to the available transmission opportunities.

The various aspects of the present disclosure may be applicable to many different physical layer timers, such as an on-demand system information block (SIB) transmission initiated by a UE RACH procedure, a RACH Msg3 to Msg4 timer during the contention resolution phase, and the like. While such a timer suspension mechanism is beneficial to many such timers, it may generally not as useful for other types of timers, such as various upper layer timers. For example, radio link monitoring (RLM) and radio link failure (RLF) timers, cell selection and re-selection timers, RRC connection related upper layer timers, and the like may not generally benefit from the described suspension mechanism of the various aspects. According to the various aspects of the present disclosure, the timer suspension or interruption functionality may be activated through configuration messages. For example, an RRC configuration signal would indicate which event timers can be interrupted or suspended, while additional configuration message or even standards-based information available to the UE can indicate which signals/channels may be valid detectable transmissions or resources used to reactivate the progression of the event timer (e.g., CSI-RSS resource, PDCCH, etc.).

Figure 7:
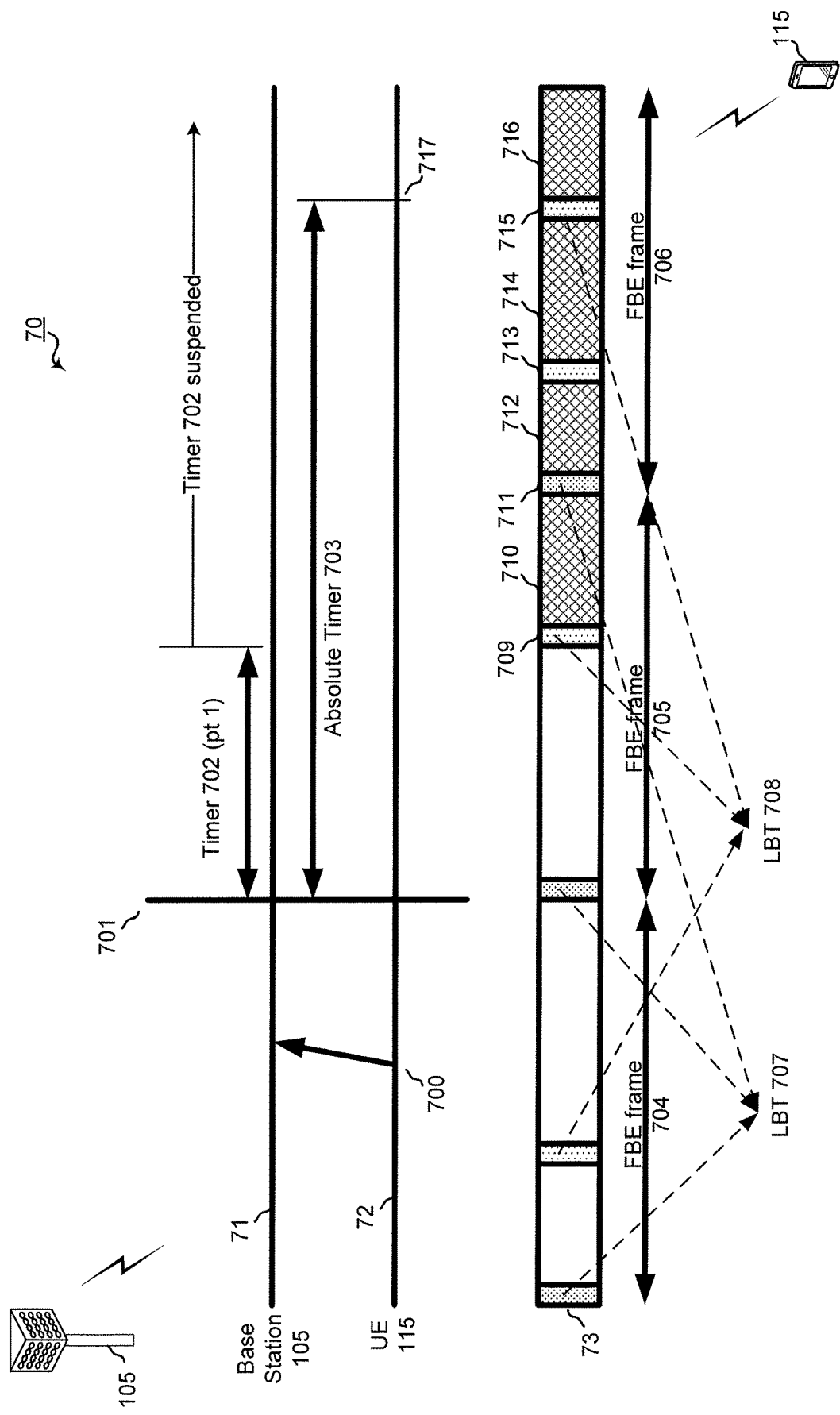
FIG. 7 is a block diagram illustrating a contention-based, shared communication spectrum network having a base station and UE configured according to one aspect of the present disclosure.

FIG. 7 is a block diagram illustrating a contention-based, shared communication spectrum network 70 having base station 105 and UE 115 configured according to one aspect of the present disclosure. As described with respect to the aspect illustrated in FIG. 5, the various aspects of the present disclosure may be applicable in frame-based equipment (FBE) operations and load-based equipment (LBE) operations. The example aspect illustrated in FIG. 7 provides wireless communications via FBE operations. Timelines 71 and 72 of base station 105 and UE 115, respectively, are visualized over frame-based communication stream 73. The illustrated portion of frame-based communication stream 73 includes FBE frames 704-706 through which base station 105 and UE 115 may communicate over the shared communication spectrum of contention-based, shared communication spectrum network 70.

At 700, UE 115 initiates an event. The event is associated with an event timer 702, which is triggered to begin at the beginning of the next transmission opportunity window 701. As illustrated, the next transmission opportunity window 701 begins with FBE frame 705. Accordingly, event timer 702 begins at next transmission opportunity window 701, as UE 115 detects successful LBT from base station 105. Base station 105 performs successful LBT procedures with beginning of frame LBT procedures 707 and intra-frame LBT procedures 708 until 709, when an LBT failure is detected. According to the illustrated aspect, when the LBT failure is detected at 709, UE 115 interrupts the progression of event timer 702. However, also according to the illustrated aspect, when event timer 702 was initiated at next transmission opportunity window 701, UE 115 also began absolute timer 703. Absolute timer 703 is not subject to the interruption operation of the various described aspects. Thus, when event timer 702 is interrupted as the failed LBT procedure is detected at 709, absolute timer 703 continues its progression. Absolute timer 703 provides an absolute window during which UE 115 may maintain the interruption of event timer 702.

As illustrated in FIG. 7, base station 105 continues to experience failed LBT procedures with failures detected of beginning of frame LBT procedures 707 and intra-frame LBT procedures 708 at 711, 713, and 715, which causes base station 105 to not have access to the shared communication spectrum at frame portions 710, 712, 714, and 716 of FBE frames 705 and 706. An indefinite length of the suspension of event timer 702 may causes a lengthy disruption of communications between UE 115 and base station 105. In order to prevent this indefinite timer interruption, absolute timer 703 is used to provide a definite time after which UE 115 may declare a failure states of the event and initiate or re-initiate the event. A response from UE 115 may also be triggered earlier than the expiration of absolute timer 702 if UE 115 receives active transmissions from base station 105 but did not receive the expected response message to the event.

Figure 8:
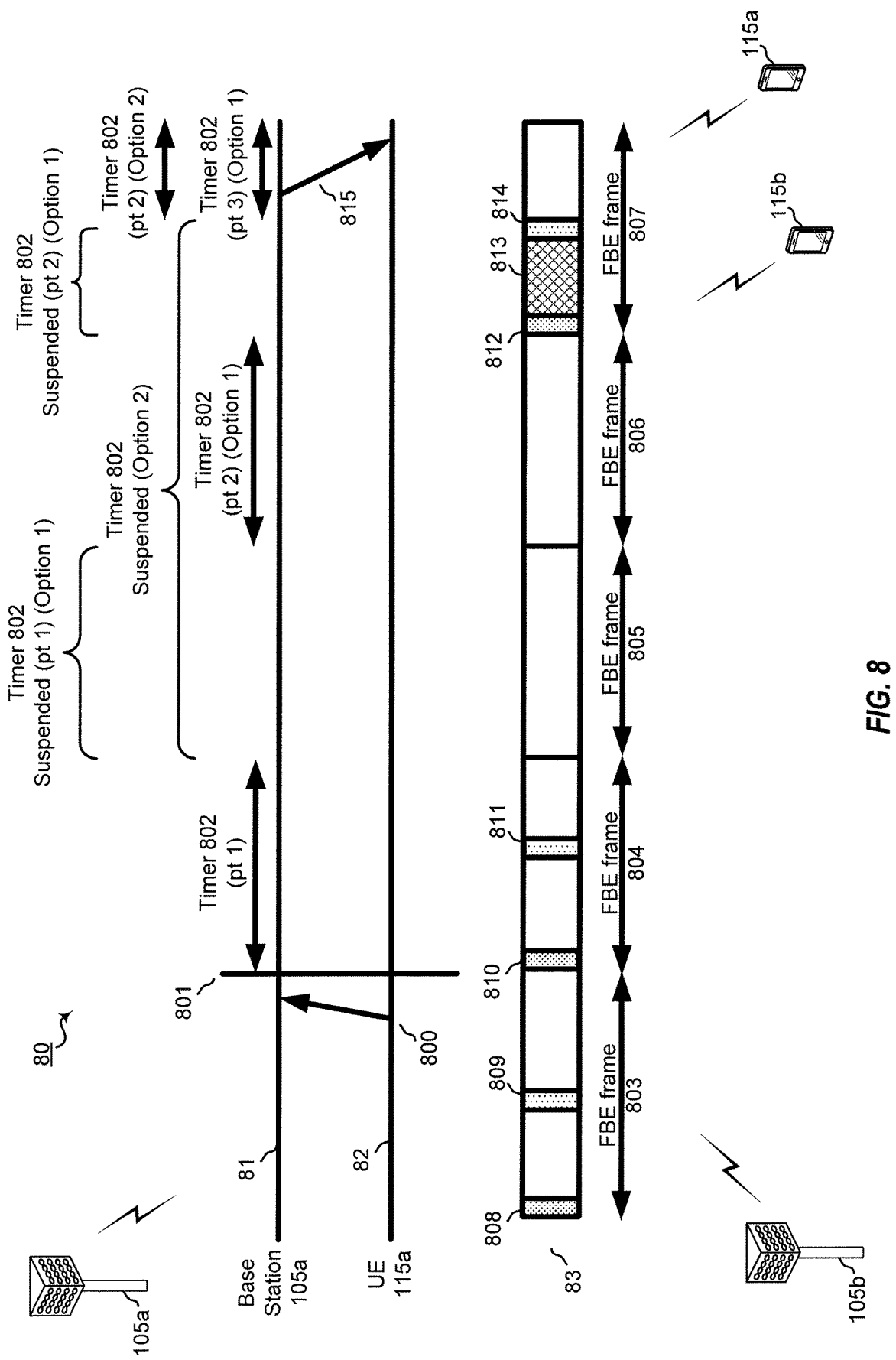
FIG. 8 is a block diagram illustrating a NR-shared spectrum (NR-SS) network having a base station and UE configured according to one aspect of the present disclosure.

FIG. 8 is a block diagram illustrating a NR-shared spectrum (NR-SS) network 80 having base station 105a and UE 115a configured according to one aspect of the present disclosure. As described with respect to the aspect illustrated in FIG. 5, the various aspects of the present disclosure may be applicable in frame-based equipment (FBE) operations and load-based equipment (LBE) operations. The example aspect illustrated in FIG. 8 provides wireless communications via FBE operations. Timelines 81 and 82 of base station 105a and UE 115a, respectively, are visualized over frame-based communication stream 83. The illustrated portion of frame-based communication stream 83 includes FBE frames 803-807 through which base station 105a and UE 115a may communicate over the shared communication spectrum of contention-based, shared communication spectrum network 80.

Base station 105b and UE 115b are neighboring to base station 105a and UE 115a and shared the same shared communication spectrum of NR-SS 80. According to the NR-SS configuration, a first network operator, on which base station 105a and UE 115a operates, has priority access to certain FBE frames, while a second network operator, on which base station 105b and UE 115b operates, has priority access to other FBE frames. For the portion of frame-based communication stream 83 illustrated, the first network operator has dedicated priority access to FBE frames 803 and 807, while the second network operator has dedicated priority access to FBE frame 805. FBE frames 804 and 806 are opportunistically shared between each of the network operators. In NR-SS operations, the medium is shared with other operators in a partly deterministic and partly opportunistic fashion. For example, some slots are dedicated to the first network operator (FBE frames 803 and 807), some to the second network operator (FBE frame 805), and some are shared between both operators dynamically with some limited contention (FBE frames 804 and 806).

At 800, UE 115a initiates an event. Base station 105a secures access to the shared communication spectrum with LBT procedures at 808 and 809. UE 115a starts event timer 802 at the next response opportunity 801 which coincides with the beginning of FBE frame 804. Base station 105a wins access to the opportunistic slot of FBE frame 804. UE 115a detects the signals that indicate successful LBTs at LBT 810 and 811 by base station 105a. The next frame, FBE frame 805 is a dedicated priority slot for the second network operator. Thus, UE 115a interrupts the progression of event timer 802.

In a first optional aspect, where UE 115a is aware of the slots or frames dedicated to other operators, such as through slot configuration messages, UE 115a would interrupt all event timers subject to an interruption operation during the slots or frames dedicated to the other operators. Thus, during FBE frame 806, which is an opportunistic slot that has been won by the second operator, even though base station 105a does not have access to FBE frame 806, UE 115a will restart event timer 802 because FBE frame 806 is an opportunistic slot. During the next frame, FBE frame 807, which is dedicated to the first network operator, base station 105a fails LBT procedure 812, which results in portion 813 of FBE frame 807 being inaccessible to base station 105a. UE 115a, detecting the failed LBT, would interrupt event timer 802 a second time. When UE 115a detects that base station 105a has successfully completed LBT procedure 814, UE 115a will resume event timer 802. Base station 105a transmits the expected event response 815, which UE 115a receives during progression of event timer 802.

In a second optional aspect, UE 115a would interrupt compatible timers in all slots, dedicated or opportunistic, in which base station 105a does not have medium access. In such optional aspect, UE 115a begins interruption of event timer 802 at FBE frame 805, which is dedicated to the second network operator. UE 115a will continue the interruption through the opportunistic slot of FBE frame 806, as the second network operator has won access to the shared communication spectrum in FBE frame 806. Further, UE 115a will continue the interruption to event timer 802 after detecting that base station 105a failed LBT procedure 812 of the dedicated slot of FBE frame 807. UE 115a will resume progression of event timer 802 after detecting that base station 105a has successfully completed LBT procedure 814. Again, base station 105a transmits the expected event response 815, which UE 115a receives during the resumed progression of event timer 802.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   initiating, by a user equipment (UE), an event timer in response to performance by the UE of an event, a response to which is associated with the event timer, wherein the event timer is identified within one or more event timers subject to an interruption operation;
   detecting, by the UE, a failed listen before talk (LBT) procedure of a serving base station;
   suspending, by the UE, a progression of the event timer in response to the failed LBT procedure;
   monitoring, by the UE, for a result of a subsequent LBT procedure of the serving base station; and resuming, by the UE, the progression of the event timer in response to detection of the result as a successful LBT procedure.

2. The method of claim 1, further including:
identifying, by a user equipment (UE), the one or more event timers subject to the interruption operation, wherein the identifying includes one of:
accessing a predefined event timer configuration in memory of the UE, or
receiving a configuration message from the serving base station, wherein the configuration message identifies the one or more event timers subject to the interruption operation.

3. The method of claim 1, further including:
identifying, by the UE, one or more base station transmissions that upon detection by the UE identifies success of an LBT procedure conducted by the serving base station, wherein the identifying includes one of:
accessing a predefined interruption operation configuration in memory of the UE, or
receiving an interruption operation configuration message from the serving base station, wherein the interruption operation configuration message identifies the one or more base station transmissions.

4. The method of claim 1, further including:
initiating, by the UE, an absolute timer in response to the performance of the event associated with the event timer, wherein the absolute timer is not subject to the interruption operation;
ending, by the UE, the absolute timer prior to expiration of the absolute timer in response to expiration of the event timer; and
triggering, by the UE, a UE response associated with a failure to detect the response to the event, wherein the triggering is in response to the expiration of the absolute timer prior to the expiration of the event timer.

5. The method of claim 1, further including:
suspending, by the UE, the progression of the event timer in response entry of a next slot associated with a dedicated priority access to the next slot by another operator;
monitoring, by the UE, for a next available slot for which the serving base station has one of: priority access or opportunistic access; and
resuming, by the UE, the progression of the event timer in response to detection of the next available slot.

6. The method of claim 5, further including:
receiving, by the UE, a slot configuration message, wherein the slot configuration message identifies assigned slot access priorities for a plurality of future slots.

7. An apparatus configured for wireless communication, comprising:
means for initiating, by a user equipment (UE), an event timer in response to performance by the UE of an event, a response to which is associated with the event timer, wherein the event timer is identified within one or more event timers subject to an interruption operation;
means for detecting, by the UE, a failed listen before talk (LBT) procedure of a serving base station;
means for suspending, by the UE, a progression of the event timer in response to the failed LBT procedure;
means for monitoring, by the UE, for a result of a subsequent LBT procedure of the serving base station; and means for resuming, by the UE, the progression of the event timer in response to detection of the result as a successful LBT procedure.

8. The apparatus of claim 7, further including:
means for identifying, by a user equipment (UE), the one or more event timers subject to the interruption operation, wherein the means for identifying includes one of:
means for accessing a predefined event timer configuration in memory of the UE, or
means for receiving a configuration message from the serving base station, wherein the configuration message identifies the one or more event timers subject to the interruption operation.

9. The apparatus of claim 7, further including:
means for identifying, by the UE, one or more base station transmissions that upon detection by the UE identifies success of an LBT procedure conducted by the serving base station, wherein the means for identifying includes one of:
means for accessing a predefined interruption operation configuration in memory of the UE, or
means for receiving an interruption operation configuration message from the serving base station, wherein the interruption operation configuration message identifies the one or more base station transmissions.

10. The apparatus of claim 7, further including:
means for initiating, by the UE, an absolute timer in response to the performance of the event associated with the event timer, wherein the absolute timer is not subject to the interruption operation;
means for ending, by the UE, the absolute timer prior to expiration of the absolute timer in response to expiration of the event timer; and
means for triggering, by the UE, a UE response associated with a failure to detect the response to the event, wherein the means for triggering is executed in response to the expiration of the absolute timer prior to the expiration of the event timer.

11. The apparatus of claim 7, further including:
means for suspending, by the UE, the progression of the event timer in response entry of a next slot associated with a dedicated priority access to the next slot by another operator;
means for monitoring, by the UE, for a next available slot for which the serving base station has one of: priority access or opportunistic access; and
means for resuming, by the UE, the progression of the event timer in response to detection of the next available slot.

12. The apparatus of claim 11, further including:
means for receiving, by the UE, a slot configuration message, wherein the slot configuration message identifies assigned slot access priorities for a plurality of future slots.

13. A non-transitory computer-readable medium having program code recorded thereon, the program code comprising:
program code executable by a computer for causing the computer to initiate, by a user equipment (UE), an event timer in response to performance by the UE of an event, a response to which is associated with the event timer, wherein the event timer is identified within one or more event timers subject to an interruption operation;

program code executable by the computer for causing the
computer to detect, by the UE, a failed listen before talk
(LBT) procedure of a serving base station;

program code executable by the computer for causing the
computer to suspend, by the UE, a progression of the
event timer in response to the failed LBT procedure;

program code executable by the computer for causing the
computer to monitor, by the UE, for a result of a
subsequent LBT procedure of the serving base station;
and program code executable by the computer for causing the
computer to resume, by the UE, the progression of the
event timer in response to detection of the result as a
successful LBT procedure.

14. The non-transitory computer-readable medium of claim 13, further including:

program code executable by the computer for causing the
computer to identify, by a UE, the one or more event
timers subject to the interruption operation, wherein the
program code executable by the computer for causing
the computer to identify includes one of:

program code executable by the computer for causing
the computer to access a predefined event timer
configuration in memory of the UE, or program code executable by the computer for causing
the computer to receive a configuration message
from the serving base station, wherein the configuration message identifies the one or more event
timers subject to the interruption operation.

15. The non-transitory computer-readable medium of claim 13, further including:

program code executable by the computer for causing the
computer to identify, by the UE, one or more base
station transmissions that upon detection by the UE
identifies success of an LBT procedure conducted by
the serving base station, wherein the program code
executable by the computer for causing the computer to
identify includes one of:

program code executable by the computer for causing
the computer to access a predefined interruption
operation configuration in memory of the UE, or program code executable by the computer for causing
the computer to receive an interruption operation
configuration message from the serving base station,
wherein the interruption operation configuration
message identifies the one or more base station
transmissions.

16. The non-transitory computer-readable medium of claim 13, further including:

program code executable by the computer for causing the
computer to initiate, by the UE, an absolute timer in
response to the performance of the event associated
with the event timer, wherein the absolute timer is not
subject to the interruption operation;

program code executable by the computer for causing the
computer to end, by the UE, the absolute timer prior to
expiration of the absolute timer in response to expiration of the event timer; and program code executable by the computer for causing the
computer to trigger, by the UE, a UE response associated with a failure to detect the response to the event,
wherein the program code executable by the computer
for causing the computer to trigger is executed in
response to the expiration of the absolute timer prior to
the expiration of the event timer.

17. The non-transitory computer-readable medium of claim 13, further including:

program code executable by the computer for causing the
computer to suspend, by the UE, the progression of the
event timer in response entry of a next slot associated
with a dedicated priority access to the next slot by
another operator;

program code executable by the computer for causing the
computer to monitor, by the UE, for a next available
slot for which the serving base station has one of:
priority access or opportunistic access; and program code executable by the computer for causing the
computer to resume, by the UE, the progression of the
event timer in response to detection of the next available slot.

18. The non-transitory computer-readable medium of claim 17, further including:

program code executable by the computer for causing the
computer to receive, by the UE, a slot configuration
message, wherein the slot configuration message identifies assigned slot access priorities for a plurality of
future slots.

19. An apparatus configured for wireless communication, the apparatus comprising:

at least one processor; and a memory coupled to the at least one processor, wherein the at least one processor is configured:

to initiate, by a user equipment (UE), an event timer in
response to performance by the UE of an event, a
response to which is associated with the event timer,
wherein the event timer is identified within one or
more event timers subject to an interruption operation;

to detect, by the UE, a failed listen before talk (LBT)
procedure of a serving base station;

to suspend, by the UE, a progression of the event timer
in response to the failed LBT procedure;

to monitor, by the UE, for a result of a subsequent LBT
procedure of the serving base station; and to resume, by the UE, the progression of the event timer
in response to detection of the result as a successful
LBT procedure.

20. The apparatus of claim 19, further including configuration of the at least one processor:

to identify, by a UE, the one or more event timers subject
to the interruption operation, wherein the configuration
of the at least one processor to identify includes configuration of the at least one processor to one of:

access a predefined event timer configuration in
memory of the UE, or receive a configuration message from the serving base
station, wherein the configuration message identifies
the one or more event timers subject to the interruption operation.

21. The apparatus of claim 19, further including configuration of the at least one processor:

to identify, by the UE, one or more base station transmissions that upon detection by the UE identifies success
of an LBT procedure conducted by the serving base
station, wherein the configuration of the at least one
processor to identify includes configuration of the at
least one processor to one of:

access a predefined interruption operation configuration in memory of the UE, or receive an interruption operation configuration message from the serving base station, wherein the
interruption operation configuration message identifies the one or more base station transmissions.

22. The apparatus of claim 19, further including configuration of the at least one processor:
- to initiate, by the UE, an absolute timer in response to the performance of the event associated with the event timer, wherein the absolute timer is not subject to the interruption operation;
- to end, by the UE, the absolute timer prior to expiration of the absolute timer in response to expiration of the event timer; and
- to trigger, by the UE, a UE response associated with a failure to detect the response to the event, wherein the configuration of the at least one processor to trigger is executed in response to the expiration of the absolute timer prior to the expiration of the event timer.

23. The apparatus of claim 19, further including configuration of the at least one processor:
- to suspend, by the UE, the progression of the event timer in response entry of a next slot associated with a dedicated priority access to the next slot by another operator;
- to monitor, by the UE, for a next available slot for which the serving base station has one of: priority access or opportunistic access; and
- to resume, by the UE, the progression of the event timer in response to detection of the next available slot.

24. The apparatus of claim 23, further including configuration of the at least one processor to receive, by the UE, a slot configuration message, wherein the slot configuration message identifies assigned slot access priorities for a plurality of future slots.

* * * * *